United States Patent [19]

Brown et al.

[11] Patent Number: 4,726,520

[45] Date of Patent: Feb. 23, 1988

[54] CONTINUOUS TUBE EMITTER

[75] Inventors: Richard D. Brown; Edward J. Pitchford, both of Glendora; Mathias Plotkin, Huntington Beach; Hans D. Christen, LaVerne; Octavian Dumitrascu, Fountain Valley, all of Calif.

[73] Assignee: Rain Bird Sprinkler Mfg. Corp., Glendora, Calif.

[21] Appl. No.: 862,060

[22] Filed: May 9, 1986

Related U.S. Application Data

[63] Continuation-in-part of Ser. No. 605,271, Mar. 30, 1984, abandoned.

[51] Int. Cl.$^4$ .................. B05B 15/00; A62C 37/20
[52] U.S. Cl. ........................... 239/542; 239/547; 239/562
[58] Field of Search ............ 239/542, 547, 562, 533.13, 239/576, 553.5

[56] References Cited

U.S. PATENT DOCUMENTS

| | | | |
|---|---|---|---|
| 3,570,382 | 4/1976 | Spencer | 239/542 X |
| 4,009,832 | 3/1977 | Tiedt | 239/542 |
| 4,385,727 | 5/1983 | Spencer | 239/542 X |
| 4,430,020 | 2/1984 | Robbins | 239/542 X |
| 4,541,569 | 9/1985 | Langa | 239/542 X |

FOREIGN PATENT DOCUMENTS 160299 11/1985 European Pat. Off. ............ 239/542

Primary Examiner—Andres Kashnikow
Assistant Examiner—Patrick N. Burkhart
Attorney, Agent, or Firm—Kelly, Bauersfeld & Lowry

[57] ABSTRACT

A continuous tube emitter comprises an elongated flexible plastic tube with internal pressure-responsive flow control units to control the flow rate of irrigation water through outlet openings in the tube. The flexible plastic tube is formed from an elongated thin film web having one or more relatively thicker valve members on one side thereof defining a plurality of valve faces, wherein each valve face includes at least one shallow drip emission groove leading into a valve reservoir of wider cross section and communicating respectively with the outlet openings cut through the web. One longitudinal margin of the web is trimmed to form laterally projecting flaps at longitudinal positions generally corresponding with the valve faces. The web is then rolled upon itself about a longitudinal axis and longitudinally seamed to form the continuous tube emitter with the flaps each internally overlying the valve reservoir and a portion of the drip emission groove of a respective valve face to define one of the flow control units. In a preferred form, the flaps include structure for maintaining the flaps in close overlying relation with the valve faces. In use, water pressure within the tube forces the flaps into engagement with the aligned valve faces to restrict and control the rate of water flow through the outlet openings.

45 Claims, 22 Drawing Figures

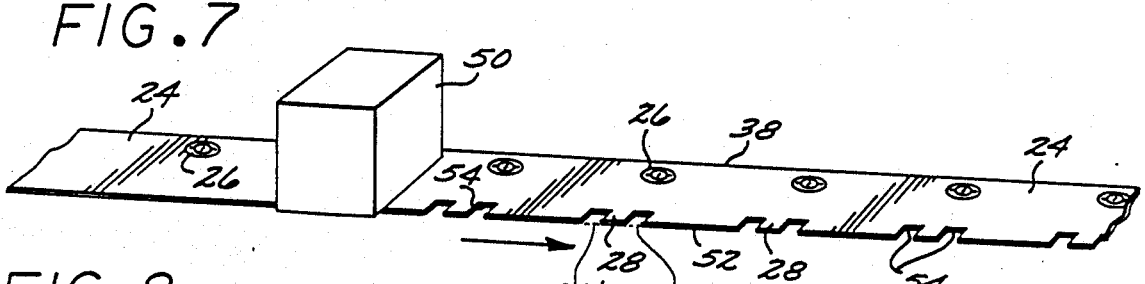
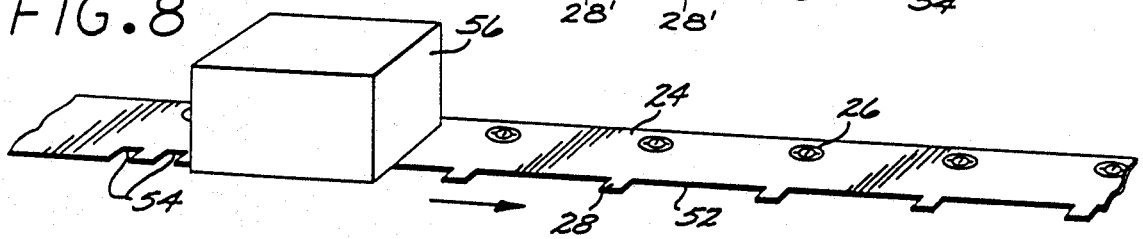
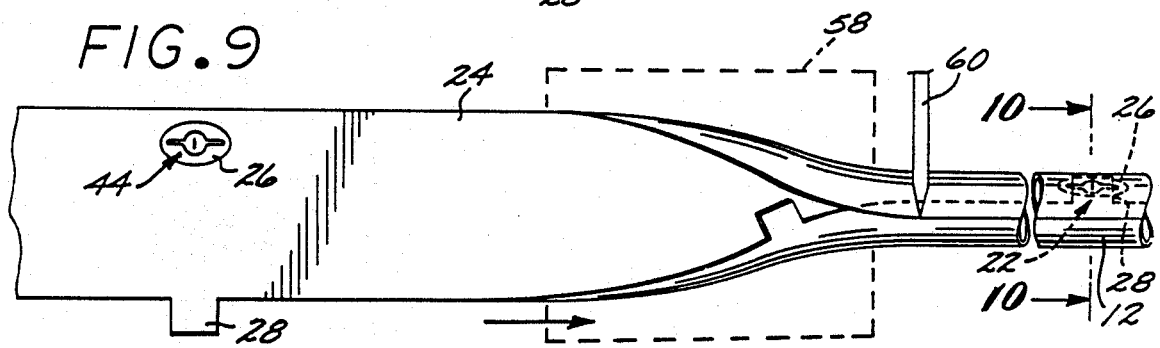
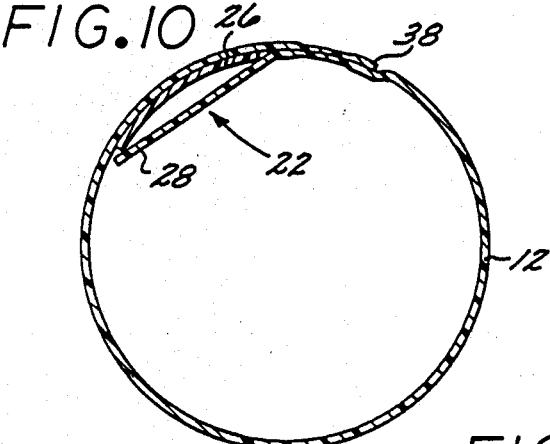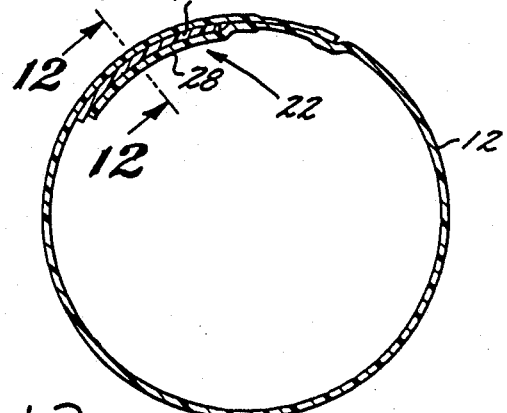
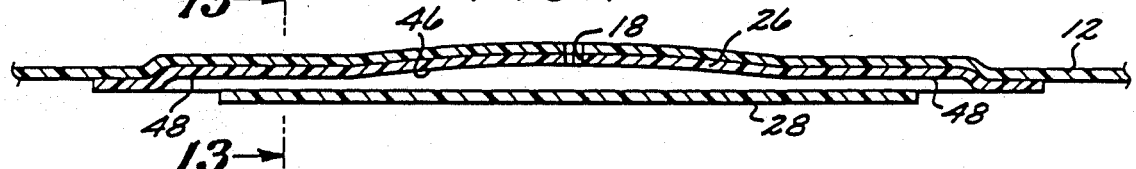
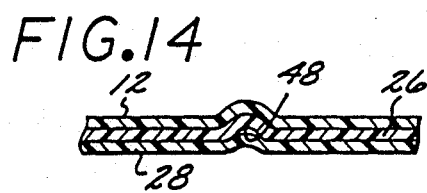

CONTINUOUS TUBE EMITTER

BACKGROUND OF THE INVENTION

This is a continuation-in-part of copending application Ser. No. 605,271, filed Mar. 30, 1984 now abandoned.

This invention relates generally to irrigation equipment of a type designed for delivering irrigation water to crops and the like at a relatively slow substantially drip flow rate. More particularly, this invention relates to improved and economical continuous tube emitters and their methods of manufacture, wherein the continuous tube emitters have a plurality of outlet openings through which the flow rate of irrigation water is controlled and regulated in response to water supply pressure.

A variety of so-called continuous tube emitters for irrigation purposes are generally known in the art. Such continuous tube emitters typically comprise an elongated tube of rigid or flexible construction having a plurality of outlet openings formed along its length and through which irrigation water is discharged at a relatively slow, substantially drip flow rate, such as a flow rate less than about one gallon per hour. With such devices, it is intended that irrigation water be discharged at selected points along the tube for delivery to adjacent crops and the like without significant water waste from evaporation and further without significant soil erosion.

Previously available continuous tube emitters have utilized many different structural techniques intended to leak water slowly through outlet openings at spaced intervals along the length of the tube. For example, continuous tube emitters have been suggested with fibrous or other porous substances occluding the outlet openings to permit slow water leakage therethrough, such as those devices depicted in U.S. Pat. Nos. 3,777,987 and 3,799,422. Other continuous tube emitter designs have proposed concentric or multiple tube constructions wherein irrigation water is leaked through a series of small pressure- and flow-reducing orifices. See, for example, the emitter designs shown and described in U.S. Pat. Nos. Re. 28,095; 3,361,359; 3,672,571; and 3,903,929. Still other tube emitter designs have proposed relatively complex and elongated or labyrinth flow path configurations for reducing the flow rate and pressure of water discharged through outlet openings, such as those devices depicted in U.S. Pat. Nos. 4,002,684; 4,077,570; and 4,077,571. However, in these exemplary continuous tube emitter designs, the requisite low water flow rates have generally required outlet openings or leakage paths of small cross-sectional area which are highly susceptible to clogging by dirt or other particulate matter commonly present in most water supply systems. Accordingly, these various emitter tube configurations have frequently required costly water filtration equipment to prevent frequent clogging whereby these devices generally have not gained widespread commercial acceptance.

In an effort to provide drip discharge of irrigation water without significant clogging risk, a variety of improved emitter designs have been proposed to include means for flushing particulate from water outlet openings. These improved emitter designs generally have used water openings of larger cross section in combination with movable valve members responsive to water supply pressure for allowing relatively high flushing flows through the outlet openings when the water pressure is low but partially blocking the outlet openings during higher water pressures to reduce water flow to a substantially drip rate. More specifically, in use, these valve members are intended to permit a relatively high flushing flow through the outlet openings when a water supply is turned on and then move to drip flow positions as water pressure builds within a supply tube or pipe. In many such emitter designs, these pressure-responsive movable valve members have been mounted within individual valve housings which are mounted in turn upon the water supply tube, such as depicted in U.S. Pat. Nos. 3,693,888; 3,779,468; 3,807,430; 3,954,223; 4,424,936; and 4,502,631. However, the addition of movable valve members and their attendant housings substantially and undesirably increases the complexity and cost of the emitter tube system, particularly when used for irrigating large agricultural areas. Moreover, such emitter designs are not well adapted for optional installation underground prior to planting of a crop, nor have such emitter designs been compatible for use with inexpensive flexible plastic water supply tubing.

Still other continuous tube emitter designs have been proposed which attempt to incorporate movable valve members directly into an elongated water supply tube which, in some designs, is formed from a flexible plastic material for expansion and contraction in response to changing water pressure. See, for example, U.S. patent application Ser. No. 570,382, published Apr. 13, 1976, and U.S. Pat. Nos. 3,797,754; 4,009,832; and 4,385,727. However, these continuous tube emitter configurations have been specifically limited to relatively complex tube wall geometries requiring special prefabricated and relatively thick tubing formed by extrusion processes and the like. In addition, these emitter configurations have generally required complex geometries for the movable valve members which are then installed within the tubes by techniques which are incompatible with economical high rate production processes. Still further, the limitation of such prior emitters to relatively thick, extruded components has not provided satisfactory pressure-responsive movement of valve members between flush and drip flow modes, resulting frequently in excessive flush flows and/or a failure to assume drip flow mode operation. As a result, these previous continuous tube emitter designs have been relatively difficult and costly to manufacture and have been sufficiently unreliable in operation to prevent any widespread commercial adoption and use.

There exists, therefore, a significant need for an improved continuous tube emitter which can be manufactured in high production quantities and which avoids use of complex geometric shapes or costly manufacturing process steps or materials. Moreover, there exists a need for such an improved continuous tube emitter which will reliably provide the desired water pressure-responsive flow outputs in use. The present invention fulfills these needs and provides further related advantages.

SUMMARY OF THE INVENTION

In accordance with the invention, an improved continuous tube emitter comprises an elongated, thin-walled flexible tube carrying internal flow control units for regulating the flow rate of irrigation water through outlet openings in the tube in response to water supply pressure. The flexible tube and flow control units are constructed from relatively inexpensive material and further in accordance with a new and improved process to provide a low cost emitter system which is highly reliable in use.

The continuous tube emitter is formed from an elongated web of a thin-walled plastic material, particularly such as a thin and highly flexible blown film material having a thickness less than about 10 mils and preferably on the order of about 2–5 mils. The flow control units include a plurality of individual valve members or, in an alternative form, an elongated valve member strip disposed along one side margin of the web and formed from a comparatively thicker material to accept and define a plurality of recessed valve faces. Each valve face is defined by a relatively shallow drip emission groove leading into a larger valve reservoir which communicates in turn with a respective outlet opening formed through the valve member and the web. In accordance with the preferred apparatus and method of the invention, the valve members or valve member strip are formed from a flexible plastic material chosen for secure adherence to the web by a heat sealing process or the like and further for a capability to retain the valve face geometry particularly when the valve face is formed by embossing.

The longitudinal margin of the tube-forming web opposite the valve faces is trimmed to define a longitudinally spaced plurality of integral flaps projecting laterally from the web, with each flap aligned longitudinally with a respective one of the valve faces. The tube-forming web is then rolled upon itself about a longitudinal axis with its side margins overlapping to define an elongated tubular structure with the valve members or valve member strip positioned internally. The thus-formed tube is longitudinally seamed and sealed by a heat seal process or the like. Importantly, when rolled to tubular shape, the laterally projecting flaps are disposed in internal overlying relation with the respective valve faces and cooperate therewith to define the plurality of flow control units. Each flap has a longitudinal configuration for covering the associated valve reservoir and a portion of the adjacent drip emission groove, while leaving a portion of the drip emission groove exposed to water flow from the interior of the tube.

In accordance with one preferred tube emitter configuration, the drip emission groove for each valve face guides water flow therethrough in a first direction for passage into the associated valve reservoir and for subsequent direction-changing flow within the reservoir prior to discharge through the tube outlet opening. In one form, this direction-changing flow is achieved by positioning the associated outlet opening generally between the drip emission groove and the valve reservoir but with said outlet opening oriented to permit discharge flow in a second direction generally opposite said first direction. With this configuration, drip flow discharge is achieved substantially without undesired spitting or other high velocity discharge.

According to another preferred aspect of the invention, the individual flaps on the web are associated with means for retaining the flaps in relatively close overlying relation with their associated valve faces. In one form, this retention means comprises relatively narrow web bridge strips connecting the flaps to the remainder of said web to prevent uncontrolled flap displacement substantially without impairing flap flexibility.

In use, water supplied to the tube interior expands the flexible plastic tube to a generally circular cross-sectional shape resulting in radially outward forces urging the flaps toward engagement with their associated valve faces. When the water pressure is relatively low, the flaps rest in close but slightly spaced relation with the associated valve faces thereby permitting a flushing water flow rate into the valve reservoirs and through the outlet openings. However, with a relatively higher water pressure, the flaps are urged into sealing engagement against the valve faces to restrict water flow substantially to a drip rate in accordance with the cross-sectional areas of the drip emission grooves and further through the outlet openings to the exterior of the tube.

Other feactures and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 7 is a fragmented perspective view illustrating the formation of laterally projecting flaps along one longitudinal margin of the tube-forming web;

FIG. 8 is a fragmented perspective view illustrating trimming of excess material from the tube-forming web between the flaps;

FIG. 9 is a fragmented plan view illustrating formation of the tube-forming web into a longitudinally elongated tubular shape;

FIG. 10 is an enlarged transverse vertical section taken generally on the line 10—10 of FIG. 9 and illustrating the continuous tube emitter in a flushing mode of operation;

FIG. 11 is an enlarged transverse vertical section generally similar to FIG. 10 and illustrating the continuous tube emitter in an emitter mode of operation;

FIG. 12 is an enlarged section taken generally on the line 12—12 of FIG. 11;

FIG. 13 is an enlarged section taken generally on the line 13—13 of FIG. 12;

FIG. 14 is an enlarged section generally similar to FIG. 13 and illustrating pressure compensation movement of the flap during the emitter mode of operation;

DETAILED DESCRIPTION OF THE PREFERRED EMBODIMENTS

Figure 1:
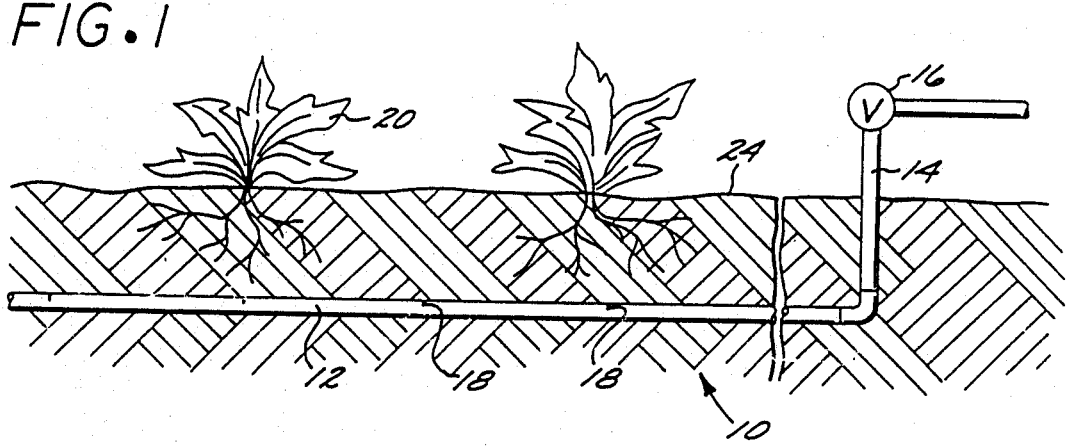
FIG. 1 is a schematic representation depicting underground installation and use of a continuous tube emitter embodying the novel features of the invention.

As shown in the exemplary drawings, a continuous tube emitter referred to generally in FIG. 1 by the reference numeral 10 is provided for controlled supply of irrigation water to agricultural crops and the like. The continuous tube emitter 10 comprises an elongated, collapsible thin-walled irrigation tube 12 adapted for appropriate connection to a water supply pipe 14 including a suitable control valve 16 for controlling supply of a flow of water under pressure. A plurality of outlet openings 18 are formed at longitudinally spaced positions along the tube 12 to permit water flow from the interior to the exterior of the tube for irrigating vegetation 20 such as crops and the like, wherein the water flow rate through the outlet flow openings is controlled by pressure-responsive internal flow control units 22 (shown in one form in FIGS. 9–11). As illustrated in FIG. 1, the continuous tube emitter 10 can be buried below the surface 24 of the ground, or, alternatively, the tube 10 can be installed above the ground surface, if desired.

Figure 16:
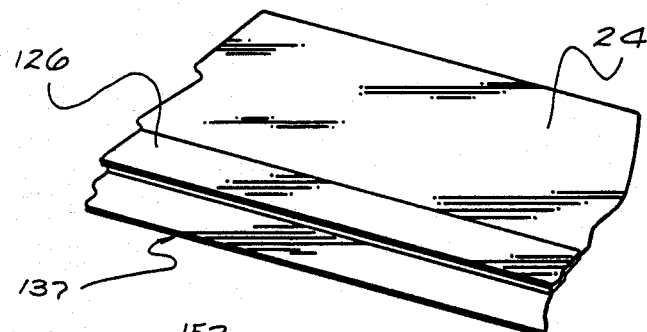
FIG. 16 is a fragmented perspective view illustrating the partially formed continuous tube emitter corresponding with the encircled region 16 of FIG. 15 and showing an elongated valve member strip mounted onto a elongated flexible plastic web.
Figure 17:
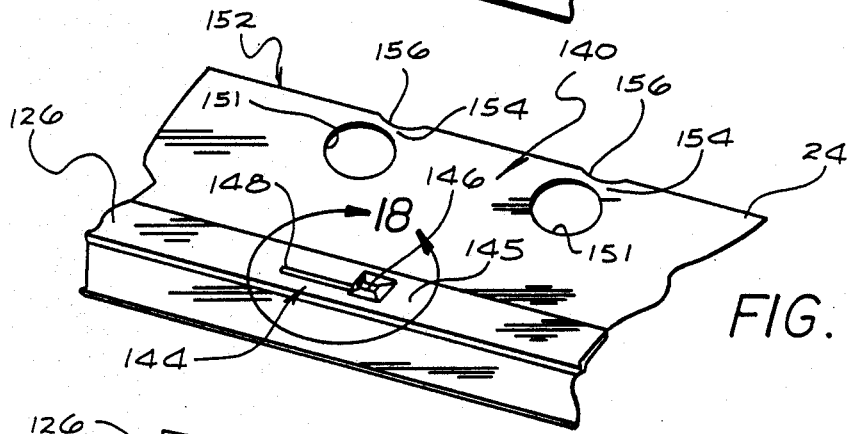
FIG. 17 is a fragmented perspective view illustrating the partially formed continuous tube emitter corresponding with the encircled region 17 of FIG. 15 and showing a recessed valve face formed in the valve member strip at a position generally in alignment with a flap formed in the web.

The continuous tube emitter is manufactured from relatively inexpensive materials and in accordance with a new and improved manufacturing process to provide a relatively simple and highly economical continuous tube emitter system which operates reliably in use to provide the desired pressure responsive water flow rates. More particularly, the continuous tube emitter 10 is formed from a relatively inexpensive thin-walled flat strip or web 24 (FIGS. 2 and 16) of a flexible blown film plastic material which can be processed economically and at high production rates to form the elongated collapsible tube. Moreover, the flow control units are also formed from relatively inexpensive flexible plastic materials including relatively small valve members 26 (FIG. 3) or an elongated valve member strip 126 (FIG. 16) which may be secured onto the web 24, together with flaps (FIGS. 7 and 17) formed integrally with the web 24. In use, the flow control units respond in a reliable manner to water pressure within the tube to permit relatively high flushing water flow rates through the outlet openings when the water pressure is relatively low to flush dirt and other particulate matter from the system. At relatively higher water pressures, however, the flow control units restrict the water flow through the outlet openings to a relatively slow, substantially drip flow rate.

As shown in detail in FIGS. 2–9, in accordance with one form of the invention, the emitter tube 10 is formed from the elongated flat web 24 of thin-walled flexible plastic material which can be obtained economically in bulk quantity on reels 30 or the like. The elongated web 24 is provided with a width selected in accordance with the desired diametric tube size and is drawn from the reel 30 through a series of processing stations, as will be described in more detail, for relatively high production rate processing into the form of the elongated tube 12 of desired length. The thickness of the web 24 is substantially minimized for high flexibility and optimum cost efficiency while providing sufficient structural strength to withstand anticipated water pressures in use and further for attachment thereto of the valve members 26. In this regard, the web 24 is optimally constructed by blown film processes to have a thickness less than about 10 mils and most preferably on the order of about 2–5 mils.

Figure 3:
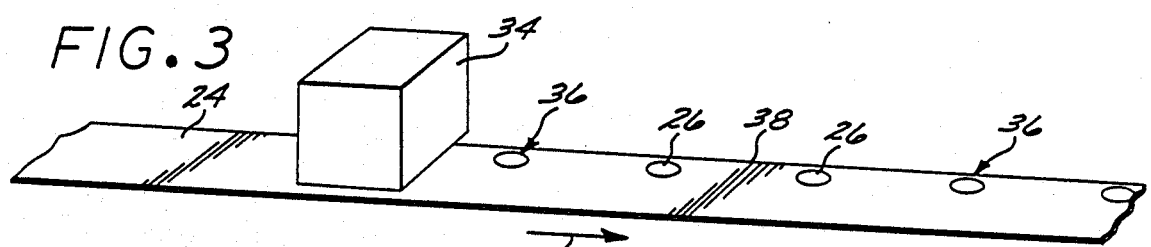
FIG. 3 is an enlarged fragmented perspective view illustrating installation of individual valve members onto the tube-forming web, in accordance with one form of the invention.

The elongated tube-forming web 24 is initially processed by conveyed passage, as depicted by arrow 32 in FIG. 3, in association with a valve member installation station 34. This installation station 34 installs individual valve members 26 onto the web 24 in selected longitudinally spaced relation and spaced a short distance, as indicated by arrow 36, from one longitudinal side margin 38 of the web. Conveniently, this valve member installation station 34 is shown schematically in FIG. 3 and may be provided in various specific constructions, although apparatus for heat bonding the valve members to the web is contemplated.

More specifically, the valve members 26 are formed from relatively small segments of a lightweight thermoplastic material having the illustrative generally oval configuration although alternative shapes, such as rectangles, squares, and the like can be used. The installation station 34 places these valve members at the desired positions on the web 24 and securely mounts them in place by a heat sealing process, or by use of an appropriate adhesive or other mounting means. The longitudinally spaced positions of the valve members 26 are chosen to correspond with positions for the water outlet openings 18 (FIG. 1) and such positions can be varied as required for a particular irrigation application.

Figure 4:
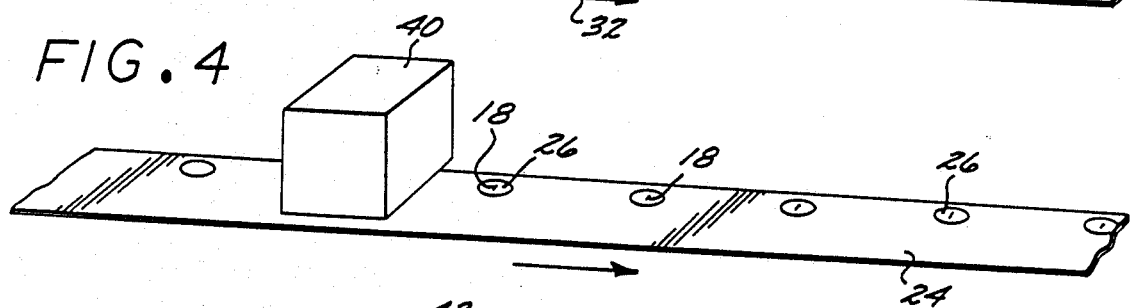
FIG. 4 is a fragmented perspective view illustrating formation of outlet openings through the individual valve members and tube-forming web.
Figure 5:
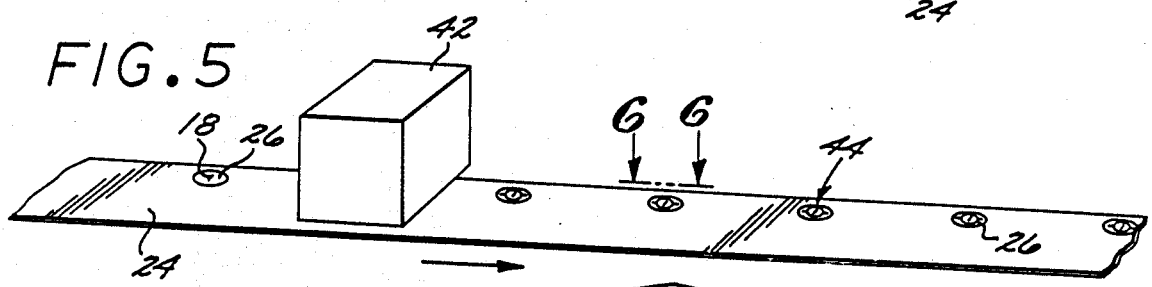
FIG. 5 is a fragmented perspective view illustrating formation of valve faces into the individual valve members at an embossing station.
Figure 6:
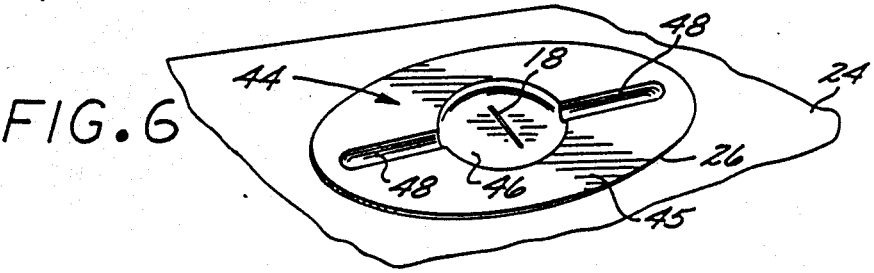
FIG. 6 is an enlarged fragmented perspective view illustrating an exemplary valve face contour formed into one of the valve members.

Subsequent to installation of the valve members 26, the tube-forming web 24 is conveyed into association with a cutting station 40 which forms the outlet openings 18 through the installed valve members 26 and further through the underlying web 24, as shown in FIG. 4. The tube-forming web is also passed into association with an embossing station 42 which embosses a recessed valve face 44 into the side of each valve member 26 presented away from the web 24, as shown in FIGS. 5 and 6. These cutting and embossing stations 40 and 42 include well known and conventional machine components, such as an appropriate cutting tool and an appropriate embossing tool, respectively, for cutting the outlet openings 18 and forming the valve faces 44. In the preferred process of the invention, these cutting and embossing steps are combined into a single processing station having a combined cutting/embossing tool for simultaneously forming the outlet opening 18 and the valve face 44 in each valve member 26. Separate processing stations, however, may be provided for association with the web in either order.

One exemplary recessed geometry for the valve face 44 formed on each valve member 26 is shown best in FIG. 6. As shown, the valve face 44 includes a generally flat surface 45 surrounding a shallow central valve reservoir 46 of generally circular shape which is circumscribed generally about or otherwise in flow communication with the outlet opening 18 formed as a short slit or cut. The exemplary valve face 44 also includes a pair of shallow and relatively narrow drip emission grooves 48 opening into the valve reservoir 46 and projecting in opposite directions therefrom along a common axis generally parallel with the longitudinal dimension of the web 24. These drip emission grooves have a cross-sectional size substantially less than that provided by the reservoir 46. Alternatively, a single drip emission groove 48 can be used if reduced water flow into the valve reservoir 46 is desired during use, as will be described.

As shown in FIG. 7, a plurality of flaps 28 are formed integrally with the web 24 by conveyed passage of the web into association with a flap cutting station 50. This cutting station 50, also depicted in schematic form, includes an appropriate cutting tool (not shown) for trimming the longitudinal side margin 52 of the web 24 opposite the margin 38 to form the laterally projecting flaps 28 of generally rectangular shape bounded by a longitudinally spaced pair of small notches 54 cut into the web margin 52. For optimum performance during operation, as will be described further with respect to the embodiment of FIGS. 15–22, narrow bridge strips 28' as shown in dotted lines in FIG. 7 may be left to extend between each flap 28 and the adjacent intermediate portions of the web. Importantly, these flasp 28 are formed at longitudinally spaced positions aligned generally with respective ones of the valve members 26 which, in the illustrative embodiment of the invention, have already been installed onto the web 24.

The web 24 may be passed in association with an optional trimming station 56 which includes an appropriate tool (not shown) of any conventional design for trimming the web margin 52 between the bases of the flap-forming notches 54, as shown in FIG. 8. This trimming step removes the intermediate plastic web material from the longitudinal margin 52 wherein this removed material can be reground or remelted for reuse, thereby minimizing the amount of plastic material required to form the continuous tube emitter 10 of the present invention. Alternately, the intermediate plastic web material remains without trimming when the bridge strips 28' are provided.

The thus-formed web 24 with the integral flaps 28 and the installed valve members 26 is rolled upon itself about a longitudinal axis to form the elongated emitter tube 12, as shown in FIG. 9. This step is performed by conventional tube-forming rolling equipment 58 of a type well known to those skilled in the art and thus represented in schematic form in the accompanying drawings. When rolled to tubular shape, the valve members 26 are all positioned entirely within the resultant tube with the flaps 28 positioned in internally overlying relation with the respective valve members 26 to define the plurality of flow control units 22. A seaming tool 60 or the like connects the now slightly overlapping web side margins 38 and 52 by a heat seal process or by alternative connecting means, such as use of an adhesive, to form a leak-free seam running the length of the tube 12.

In use, as shown in FIGS. 10–14, the flow control units 22 defined cooperatively by the thin flaps 28 and the embossed valve faces 44 on the valve members 26 regulate water flow through the outlet openings 18. More particularly, with reference to FIG. 10, water under pressure flowing through the flexible tube 12 causes the tube to inflate from a normally flat geometry toward a generally circular cross-sectional shape. At lower water pressures, such as when the irrigation valve 16 (FIG. 1) is initially turned on or is turned off, water pressure within the tube 12 is insufficient to force each flap 28 radially outwardly into substantially sealed relation with the valve face 44 of the adjacent valve member 26. As a result, the flap 28 tends to be spaced sufficiently from the now-radially curved valve member 26 to permit a flush flow of water to the associated outlet opening 18 thereby flushing dirt, grit, and other particulate from the openings 18.

However, when the water pressure within the tube 12 increases to a higher level, the flap 28 is forced by the pressure within the tube into substantially sealed overlying relation with the associated valve member 26. Advantageously, this sealing movement of the flags occurs relatively quickly as tube water pressure builds when the valve 16 is turned on to limit flush flow to a short duration and further to insure reliable switching between flush and emitter flow modes. Such rapid sealing movement is assured when the flaps are held by the narrow bridge strips 28' (FIG. 7) which prevent flap movement from close overlying relation with the valve faces. When the flaps 28 are sealed against the surface 45 of each valve member 26, entry of water into the associated outlet openings 18 is controlled in accordance with the cross-sectional flow area provided by the drip emission grooves 48 thereby insuring drip flow operation. In this regard, as shown in FIGS. 9 and 12, the longitudinal width of each flap 28 is sufficient to overlie the associated valve reservoir 46 and only a portion of the drip emission grooves 48 thereby leaving the distal ends of these grooves 48 exposed for receiving water flow from the tube interior. The drip emission grooves 48 thus provide small cross-sectional flow areas permitting a relatively small water flow from the interior of the tube for discharge substantially at a drip flow rate through the outlet openings 18.

The flow control units 22 are advantageously designed to provide pressure compensation to maintain water flow substantially constant throughout a range of drip flow mode operating pressures. More particularly, as viewed in FIGS. 13 and 14, increasing water pressure within the tube 12 tends to deform the thin flexible flaps 28 partially into the associated drip emission grooves 48 to vary the unobstructed cross-sectional flow area of those grooves generally in inverse proportion with water pressure. Accordingly, the flaps throttle flow through the grooves 48 in a pressure-responsive manner to maintain the discharge flow through the outlet openings 18 substantially constant throughout a normal operating pressure range, typically in the region of about 6–12 psi.

While the specific dimensions and selection of materials for the continuous emitter tube 10 of the present invention may vary widely in accordance with the anticipated operating environment, the valve members 26 are most preferably formed from a lightweight plastic material selected for its capability to maintain the geometry of the embossed valve face 44 for a prolonged period of time. One preferred valve member material comprises polybutylene having a thickness not greater than about 30 mils and preferably on the order of about 10 to 12 mils. In one working example of the invention, valve members 26 having a thickness of about 10 to 12 mils, a length of about one inch, and a width of about one-half inch were embossed to have a valve face geometry including a circular valve reservoir 46 approximately 0.2 inch in diameter and about 0.03 inch in depth. The drip emission grooves were formed to have lengths of about 0.2 inch, widths of about 0.02 inches, and depths of about 0.005 inch. Such valve members were installed onto an elongated web having a thickness of about 2 to 4 mils and a width of about 2.75 inches wherein the web was subsequently rolled into tubular shape and seamed to provide an inside diameter of about 0.6 inch. The flaps 28 were formed integrally with the web to have a laterally projecting length of about 0.4 inch and a width to expose the distal ends of the drip emission grooves for a distance of about 0.05 to 0.1 inch.

Figure 2:
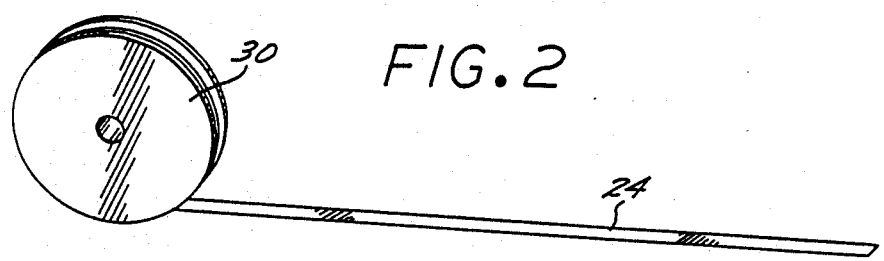
FIG. 2 is a fragmented perspective view illustrating an elongated flexible plastic web used in the formation of the continuous tube emitter.

An alternative preferred form of the invention is shown in FIGS. 15-22, wherein an elongated flexible plastic web 24 similar to the web 24 shown in FIG. 2 is processed to include a plurality of modified flow control units 122. Each of the modified flow control units incorporates a modified valve face geometry in association with an overlying flap to control water discharge flow through outlet openings formed in the web 24.

More particularly, with reference to FIGS. 15 and 16, the web 24 again comprises an elongated strip of thin and highly flexible plastic material wound onto a supply reel 130. While a variety of plastic web materials may be used, a thin film material produced by a blown film process or the like is preferred yielding an extremely thin-walled web having a thickness of less than about 10 mils and preferably on the order of about 2-5 mils. Such thin and highly flexible film material provides the necessary pressure-responsive movement of integrally formed valve flaps, as will be described.

The elongated blown film web 24 is drawn from the supply reel 130 (FIG. 15) together with an elongated valve member strip 126 carried on a separate supply reel 127. This valve member strip comprises a comparatively thicker flexible plastic strip having a preferred thickness on the order of about 10-12 mils and a strip width substantially less than the width of the web 24. The web 24 and valve member strip 126 are drawn over rollers 128 and 129, respectively, into close proximity with heating apparatus 132 which applies sufficient heat for heat bonding the strip 126 onto the web 24 as they are passed in overlying relation between nip rollers 134 and a pressure station 136. as viewed in FIG. 16, the valve member strip 126 is secured to the web on one side thereof, and at a position spaced a short distance from one side margin 137 of the web. Alternately, other attachment means can be used to secure the strip 126 onto the web 24, such as a suitable adhesive substance or the like.

The valve member strip 126 and web 24 are then drawn further through a die cutting and stamping station 138 whereat recessed valve faces 144 are formed at longitudinally spaced intervals along the strip 126. In addition, flaps 140 are formed in the side margin 152 of the web generally opposite the strip 126 but also generally in longitudinal alignment respectively with the valve faces 144. The valve faces 144 and the flaps 140 can be formed simultaneously or in successive steps in association with the die cutting and stamping station 138, with a longitudinal spacing selected to meet a particular set of irrigation requirements.

Figure 18:
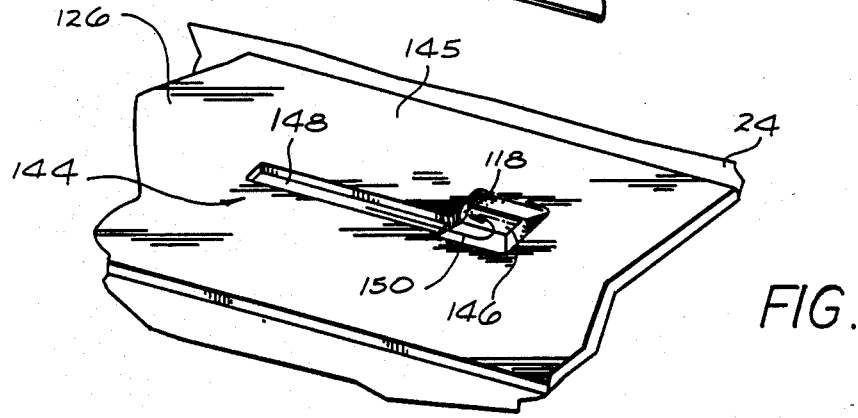
FIG. 18 is an enlarged fragmented perspective view corresponding with the encircled region 18 of FIG. 17.

A preferred valve face geometry is shown in detail in FIG. 18. As shown, the valve face 144 is recessed into a relatively flat upper surface 145 of the strip 126, with valve face including a relatively shallow drip emission groove 148 extending longitudinally along the strip 126 with one end of the groove 148 opening into a valve reservoir 146 of the somewhat larger depth and width. The drip emission groove 148 and valve reservoir 146 are positioned on opposite sides of a small outlet opening 118 cut through the strip 126 and web 24 at the station 138. Importantly, the outlet opening 118 is positioned below and preferably offset to one side of the adjacent end of the drip emission groove 148. With this construction, it is believed that water travelling through the groove 148 toward the valve reservoir 146 must undergo an approximate 180 degree change of direction before passing to the tube exterior through the outlet opening 118, as depicted by arrow 150 in FIG. 18.

The valve flaps 140, in accordance with the presently most preferred form of the invention, are formed by interrupting the web side margin 152 opposite the valve member strip 126 to increase the relative flexibility of the web in a region aligned longitudinally with each of the valve faces 144. As shown best in FIG. 17, this is achieved by forming a pair of longitudinally spaced holes 151 near the web margin, with one hole aligned for partially overlapping the adjacent drip emission groove 148 and the other hole 151 spaced longitudinally a short distance relative to the valve reservoir 146. These holes 151 are separated from the adjacent web side margin 152 by narrow bridge strips 154 of controlled transverse width preferably on the order of about 0.030 inch. Width control of these bridge strips 154 is readily obtained by additionally cutting arcuate recesses 156 into the side margin 152 in longitudinal alignment with the holes 152, whereby the transverse span of the bridge strips 154 will remain constant irrespective of minor lateral deviations of the web 24 as it is drawn through the processing stations. The region of the web 24 between each adjacent pair of the holes 151 comprises the flaps 140.

Figure 15:
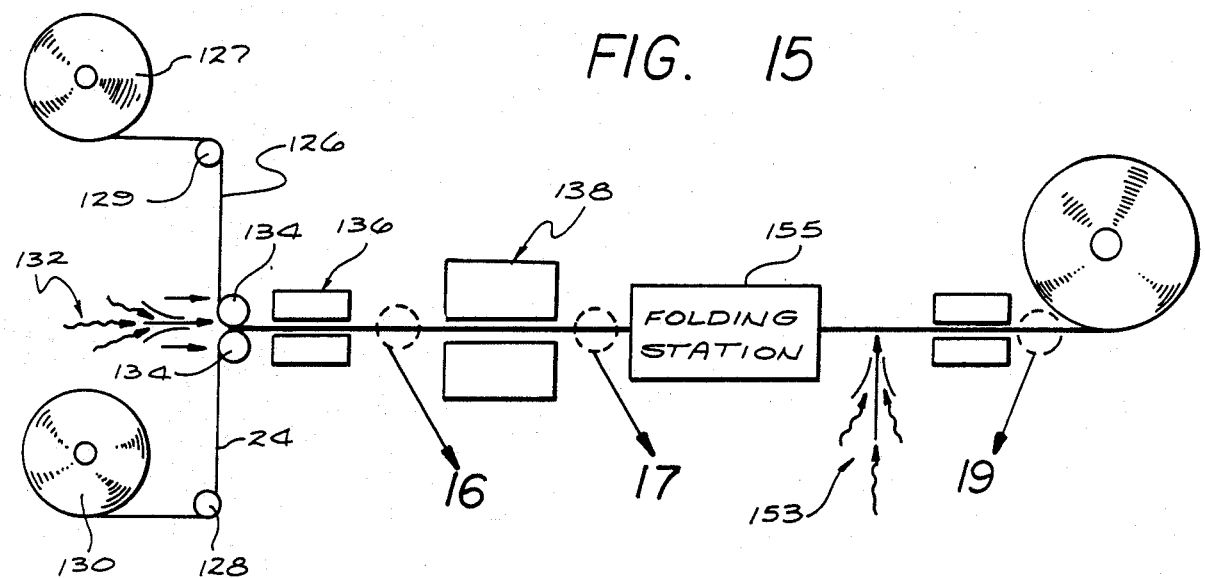
FIG. 15 is a schematic representation depicting a process of producing a continuous tube emitter in accordance with an alternative preferred form of the invention.
Figure 19:
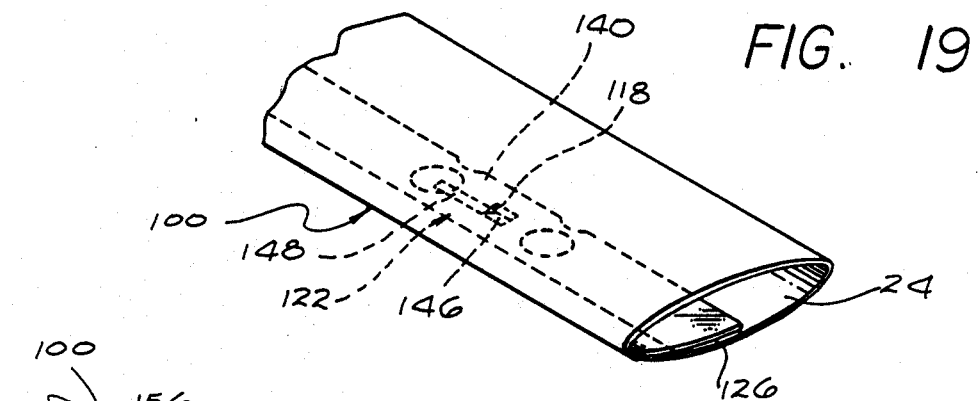
FIG. 19 is a fragmented perspective view illustrating the completed continuous tube emitter corresponding with the encircled region 19 of FIG. 17.
Figure 20:
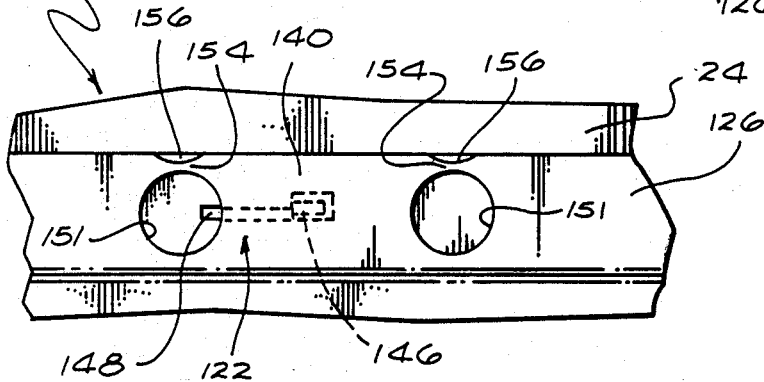
FIG. 20 is a fragmented plan view taken generally on the line 20—20 of FIG. 19, with portions broken away to illustrate overlying alignment between each flap and valve face.
Figure 21:
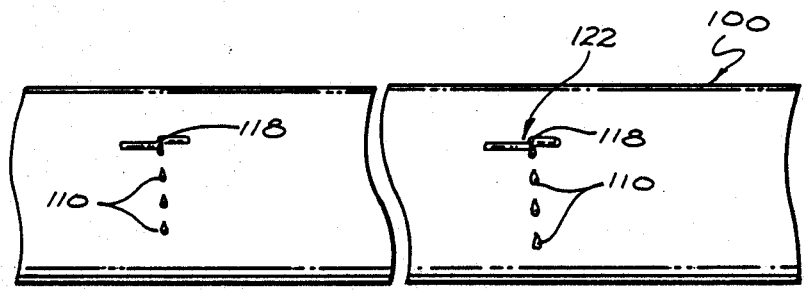
FIG. 21 is a side elevation view depicting operation of the continuous tube emitter of FIGS. 19 and 20.
Figure 22:
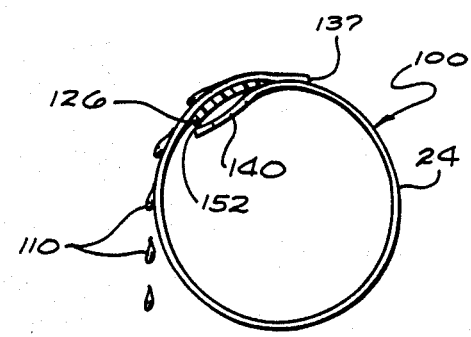
FIG. 22 is a vertical sectional view taken generally on the line 22—22 of FIG. 21.

As shown in FIGS. 15, 19 and 20, the web 24 is then rolled upon itself at a folding station 155 and longitudinally seamed along overlapping side margins by heat bonding or the like as indicated by reference numeral 153 in FIG. 15, and in generally the same manner as described generally with respect to FIG. 9, to form a continuous emitter tube 100 (FIGS. 19 and 20) with the valve member strip 126 positioned entirely within the interior thereof. The valve faces 144 on the strip 126 are presented radially inwardly for association each with one of the flaps 140 formed in the web. That is, the flaps 140 are also positioned interiorly of the tube and overlie the respective valve faces 144 with one of the flap-defining holes 151 interiorly exposing a portion of the associated drip emission groove. Importantly, the narrow bridge strips 154 associated with each flap 140 function to retain the flap generally or nearly coplanar with the remainder of the side margin 152 lying interiorly within the tube and disposed longitudinally between the flaps.

In use, when water under pressure is supplied to the resultant continuous tube emitter 100 of FIGS. 19-22, the water initially at low pressure flows past the flaps 140 which are not tightly seated against the flat surface 145 of the valve member strip 126. The water is thus permitted to flow with relative freedom into the valve reservoir 146 of each strip valve face 144 for further passage as a flushing flow through the outlet openings 118.

As internal water pressure builds within the tube 100, the water pressure urges the flaps 140 into tight sealing relation with the strip 126 to prevent direct water flow from the tube interior to the outlet openings 118. Instead, outlet water flow is restricted to substantially drip rate passage through the partially exposed drip emission grooves 148 into the associated valve reservoirs 146. The relative geometries of the drip emission grooves 148 and the associated valve reservoirs 146, as best understood, cause the water to undergo an approximate 180 degree change of direction within the reservoir 146 as a result of misalignment or offset relation with the outlet openings 118. The water thus experiences a substantial velocity reduction before drip discharge through the outlet openings 118. This drip flow rate is achieved substantially without spitting or lack of discrete droplets 110 (FIGS. 21 and 22) and further is advantageously maintained substantially constant over a range of normal operating pressures due to pressure-compensating flap deflection partially into the drip emission grooves upon pressure increases, as described with respect to FIGS. 13 and 14.

In accordance with one important feature of the embodiment of FIGS. 15–22, the web bridge strips 154 retain the flaps 140 closely against the valve faces 144 at all times. With this construction, the flaps 140 are prepositioned for rapid pressure-responsive displacement into sealed relation with the valve member strip 126. The flaps therefore do not require substantial water pressure for movement to the sealed positions thereby limiting flush flow mode to a short duration and minimal flow only slightly higher than normal drip flow, such as a brief flush flow on the order of about 1.5 times normal drip flow. This beneficially prevents high flush flows which could otherwise prevent internal pressure build-up within the tube sufficiently to move the flaps to the emitter mode sealed positions against the strip 126.

In operation, in one working form of the invention, the web 24 was selected have a material thickness of about 4 mils to have a high flexibility for sealing against the valve member strip 126 at a low pressure of about 0.5 psi, with flush flow occurring at lower pressures. When sealed against the strip 126, the outlet flow through each outlet opening remained substantially uniform throughout a normal range of operating pressures typically up to about 12 psi. In this regard, it was discovered that a tube geometry omitting the bridge strips 154 retaining the flaps 140 permitted sufficient flap flexion and deformation from the desired position closely overlying the valve faces 144 such that relatively high erosive flush flows occurred sometimes without changeover to emitter mode operation. Similarly, it was discovered that a tube geometry having flaps defined by an uninterrupted side margin 152, omitting the holes 151, did not possess sufficient flap flexibility for achieving the desired pressure compensation over normal operating ranges.

The continuous tube emitter of the present invention thus provides an effective and practical continuous tube drip emitter system which can be manufactured in high production quantities from economical materials. In use, the continuous tube emitter provides reliable pressure compensating flow regulation throughout a range of normal operating pressures and higher flushing discharge flows at relatively low pressures.

A variety of modifications and improvements to the invention described herein are believed to be apparent to those skilled in the art. Accordingly, no limitation on the invention is intended by way of the description herein, except as set forth in the appended claims.

What is claimed is:

1. A continuous tube emitter, comprising:
   an elongated web of flexible sheet material having longitudinal side margins and being rolled upon itself and longitudinally seamed to form an elongated tube having inside and outside surfaces, said web further having a plurality of outlet openings formed therein at selected longitudinally spaced positions;
   a plurality of valve members mounted on said web on the inside surface of said tube at respective positions generally overlying the outlet openings and substantially without extending into or through the outlet openings, each of said valve members defining a recessed valve face formed in the side thereof opposite said web and including at least one relatively narrow and relatively shallow drip emission groove opening into a valve reservoir of relatively larger cross section, said valve reservoir communicating with the adjacent outlet opening in said web; and
   a plurality of flexible flaps within said tube and projecting in respective and relatively loosely overlying relation with said valve members, each of said flaps having a shape to overlie the valve reservoir and a portion of the drip emission groove of the adjacent valve member leaving another portion of the groove exposed to the interior of said tube.

2. The continuous tube emitter of claim 1 wherein the outlet openings formed in said web are formed at longitudinally spaced positions generally adjacent one of said side margins, said flaps being formed integrally with said web and projecting from the other of said side margins for respectively overlying said valve members when said web is rolled upon itself to the generally tubular shape.

3. The continuous tube emitter of claim 1 further including means for retaining said flaps in relatively close overlying relation with the respective ones of said valve members.

4. The continuous tube emitter of claim 1 wherein said web is rolled upon itself and longitudinally heat seamed to form said elongated tube.

5. The continuous tube emitter of claim 1 wherein said flexible sheet material is a relatively thin-walled flexible plastic material.

6. The continuous tube emitter of claim 5 wherein said web comprises a blown film flexible plastic material.

7. The continuous tube emitter of claim 5 wherein said plastic material has a thickness on the order of about two to five mils.

8. The continuous tube emitter of claim 1 wherein said valve members comprise a plurality of individual valve members each formed from a relatively flexible plastic material and individually mounted on said web on the inside surface thereof.

9. The continuous tube emitter of claim 8 wherein said valve members are mounted by heat sealing onto said web.

10. The continuous tube emitter of claim 1 wherein the valve face formed in each of said valve members comprises an embossed valve face.

11. The continuous tube emitter of claim 10 wherein said valve members are formed from polybutylene having a thickness within the range of from about 5 mils to about 30 mils.

12. The continuous tube emitter of claim 11 wherein said valve members have a thickness within the range of from about 10 mils to about 12 mils.

13. The continuous tube emitter of claim 1 wherein said valve members comprise an elongated valve member strip mounted on said web on the inside surface thereof.

14. The continuous tube emitter of claim 1 wherein the valve face formed in each of said valve members is defined by a valve reservoir of generally circular shape and at least one drip emission groove opening into said valve reservoir.

15. The continuous tube emitter of claim 14 wherein said at least one drip emission groove comprises a pair of said grooves formed to extend generally in parallel with a longitudinal axis of said tube and opening into and extending generally in opposite directions from said valve face.

16. The continuous tube emitter of claim 1 wherein said at least one drip emission groove opening into the valve reservoir of said valve face is oriented to extend generally in parallel with a longitudinal axis of said tube.

17. The continuous tube emitter of claim 1 wherein the valve face formed in each of said valve members has a generally uninterrupted flat surface substantially surrounding said valve reservoir and said at least one drip emission groove.

18. The continuous tube emitter of claim 1 wherein each of said outlet openings and the adjacent generally aligned passage formed in the adjacent one of said valve members comprises relatively narrow aligned slits formed respectively in said tube and the adjacent one of said valve members.

19. The continuous tube emitter of claim 1 wherein each of said valve faces comprises said at least one drip emission groove extending in a first direction toward and communicating with the associated valve reservoir, said valve reservoir communicating in turn with the associated outlet opening, said outlet opening being offset relative to said drip emission groove in a position opening into said valve reservoir such that water flowing through said drip emission groove in said first direction is required to undergo directional flow change to flow through said outlet opening in a second direction generally opposite said first direction.

20. The continuous tube emitter of claim 1 wherein said at least one drip emission groove of each of said valve faces is offset relative to the associated outlet opening.

21. The continuous tube emitter of claim 2 wherein said flaps are defined by holes formed generally adjacent said other of said web side margins, said holes serving to increase the flexibility of said web in the regions thereof overlying said valve members, each of said holes being separated from said other side margin by at least one bridge strip remaining in said web for retaining said flaps in relatively close overlying relation with said valve members.

22. The continuous tube emitter of claim 2 wherein each of said flaps is defined between a pair of longitudinally spaced holes formed generally adjacent said other of said web side margins, one of said pair of holes partially overlying and partially exposing said at least one drip emission groove to the interior of said tube, said pair of holes being separated from said other side margin each by at least one bridge strip remaining in said web for retaining said flap in relatively close overlying relation with said associated valve member.

23. The continuous tube emitter of claim 22 wherein each of said bridge strips is recessed along said other web side margin.

24. The continuous tube emitter of claim 1 wherein said tube is adapted for connection to a supply of water under pressure, said tube assuming a generally collapsed cross-sectional shape at substantially zero and at relatively low water pressures whereby said flaps lie in sufficiently spaced relation with the respective ones of said valve members to permit a flush rate water flow through the outlet openings, said tube being inflatable in response to relatively higher water pressures to assume a generally circular cross-sectional shape whereby the water pressure within said tube forces said flaps into substantially sealed relation with said valve members to restrict water flow to the outlet openings in accordance with the cross-sectional size of the drip emission grooves.

25. A continuous tube emitter, comprising:
an elongated web of flexible sheet material having longitudinal side margins and being rolled upon itself and longitudinally seamed to form an elongated irrigation tube having inside and outside surfaces;
means forming a plurality of valve members mounted on said web on the inside surface of said tube and each having a recessed valve face opening generally in a direction toward a longitudinal axis of said tube, each of said recessed valve faces being defined by at least one drip emission groove opening into a valve reservoir of larger cross section;
said tube further having a plurality of outlet openings formed therein at respective positions aligned generally with said valve faces in flow communication with the valve reservoir, each of said outlet openings being positioned generally in offset relation with respect to the associated drip emission groove; and
a plurality of flexible flaps within said tube in respective relatively loosely overlying relation with said valve faces each to overlie the adjacent valve reservoir and a portion of the drip emission groove leaving another portion of the drip emission groove exposed to the interior of said tube.

26. The continuous tube emitter of claim 25 wherein said web comprises a blown film plastic sheet material.

27. The continuous tube emitter of claim 26 wherein said flaps are formed integrally with said web.

28. The continuous tube emitter of claim 26 further including means for retaining said flaps in relatively close overlying relation with said valve faces.

29. The continuous tube emitter of claim 25 wherein each of said valve faces comprises said at least one drip emission groove extending in a first direction toward and communicating with the associated valve reservoir, said valve reservoir communicating in turn with the associated outlet opening, said outlet opening being offset relative to said drip emission groove in a position opening into said valve reservoir such that water flowing through said drip emission groove in said first direction is required to undergo directional flow change to flow through said outlet opening in a second direction generally opposite said first direction.

30. The continuous tube emitter of claim 25 wherein said valve members comprise an elongated valve member strip mounted on said web on the inside surface thereof.

31. A continuous tube emitter, comprising:
an elongated web of flexible sheet material having longitudinal side margins and being rolled upon itself and longitudantly seamed to form an elongated irrigation tube, said web further having a plurality of outlet openings formed therein;
a plurality of valve members mounted onto said web on the inside surface of said tube at respective positions generally overlying the outlet openings substantially without extending into or through the outlet openings, each of said valve members having a recessed valve face opening generally toward a longitudinal axis of said tube and defined by at least one drip emission groove opening into a valve reservoir of larger cross-section, said valve reservoir communicating with the adjacent outlet opening in said web;
a plurality of flexible flaps inside said tube at respective positions to project in relative loosely overlying relation with said valve members each to overlie the adjacent valve reservoir and a portion of the drip emission groove leaving another portion of the drip emission groove exposed to the interior of said tube; and
means for retaining said flaps in relatively close yet relatively loosely overlying relation with valve faces.

32. The continuous tube emitter of claim 31 wherein said flaps are formed as an integral portion of said web and project generally laterally at one side margin thereof.

33. The continuous tube emitter of claim 32 wherein said web is formed from a blown film plastic sheet material.

34. The continuous tube emitter of claim 33 wherein said valve members having a thickness within the range of about 5 mils to about 30 mils.

35. The continuous tube emitter of claim 33 wherein said drip emission groove of each of said valve faces is offset relative to the associated outlet opening.

36. The continuous tube emitter of claim 33 wherein each of said valve faces comprises said at least one drip emission groove extending in a first direction toward and communicating with the associated valve reservoir, said valve reservoir communicating in turn with the associated outlet opening, said outlet opening being offset relative to said drip emission groove in a position opening into said valve reservoir such that water flowing through said drip emission groove in said first direction is required to undergo directional flow change to flow through said outlet opening in a second direction generally opposite said first direction.

37. The continuous tube emitter of claim 33 wherein each of said flaps is defined between a pair of longitudinally spaced holes formed in said web generally adjacent said one side margin, one of said holes partially overlying and partially exposing said drip emission groove to the interior of said tube, said pair of holes being separated from said one side margin by at least one bridge strip remaining in said web and defining said means for retaining said flap in relatively close overlying relation with the associated valve member.

38. The continuous tube emitter of claim 37 wherein said at least one bridge strip has a narrow width on the order of about 0.030 inch.

39. A continuous tube emitter, comprising:
a web of flexible sheet material rolled upon itself and longitudinally seamed to form an irrigation tube with a central longitudinal axis and having inside and outside surfaces;
at least one valve member of a flexible sheet material mounted on said web on the inside surface of said tube, said valve member having a recessed valve face opening generally toward the longitudinal axis and defined by at least one drip emission groove opening into a valve reservoir;
said valve member and web cooperating to define an outlet opening formed through said valve recess and said web with said valve member positioned substantially completely within the interior of said tube; and
at least one flexible flap formed integrally with said web and disposed inside said tube in internal overlying relation with said valve member, said flap being shaped to substantially cover said valve face leaving a portion of said drip emission groove generally opposite said valve reservoir exposed to the interior of said tube.

40. The continuous tube emitter of claim 39 wherein said web is formed from a blown film plastic material.

41. The continuous tube emitter of claim 39 wherein said drip emission groove extends in a first direction leading into said valve reservoir, said outlet opening leading from said valve reservoir in a second direction generally opposite said first direction.

42. The continuous tube emitter of claim 41 wherein said outlet opening is longitudinally positioned generally between said drip emission groove and said valve reservoir.

43. A continuous tube emitter, comprising:
an elongated and relatively thin-walled blown film web of plastic sheet material having longitudinal side margins and rolled upon itself with said side margins slightly overlapping each other to form an elongated irrigation tube having inside and outside surfaces;
a longitudinal seam connecting together said side margins of said web;
a plurality of valve members mounted individually on said web on the inside surface of said tube at selected longitudinally spaced positions and in laterally spaced relation with one of said side margins on said tube, each of said valve members being formed from a flexible plastic material and having a valve face formed therein opening generally toward a central longitudinal axis of said tube, said valve face being defined by at least one relatively shallow, relatively narrow drip emission groove extending generally in parallel with the longitudinal tube axis and opening at one end into a valve reservoir of relatively larger cross section;
said valve members and said web cooperating to define a plurality of relatively small outlet openings each communicating with a respective one of said valve reservoirs;
a plurality of flexible flaps formed integrally with said web generally at the other of said side margins on the inside of said tube and in respective internal overlying relation with said valve members, each of said flaps being shaped to substantially cover the adjacent valve face leaving exposed to the interior of said tube a portion of the adjacent drip emission groove opposite the valve reservoir; and;

means for retaining said flaps in relatively close overlying relation with said valve members.

44. A continuous tube emitter, comprising;

an elongated web of flexible sheet material having longitudinal side margins and being rolled upon itself and longitudinally seamed to form an elongated irrigation tube, said web further having a plurality of outlet openings formed therein;

a plurality of valve members mounted onto said web on the inside surface of said tube at respective positions generally overlying the outlet openings substantially without extending into or through the outlet openings, each of said valve members having a recessed valve face opening generally toward a longitudinal axis of said tube and defined by at least one drip emission groove opening into a valve reservoir of larger cross-section, said valve reservoir communicating with the adjacent outlet opening in said web; and a plurality of flexible flaps inside said tube at respective positions to project in overlying relation with said valve members each to overlie the adjacent valve reservoir and a portion of the drip emission groove leaving another portion of the drip emission groove exposed to the interior of said tube;

each of said valve faces having said at least one drip emission groove extending in a first direction toward and communicating with the associated valve reservoir, said valve reservoir communicating in turn with the associated outlet opening, said outlet opening being offset relative to said drip emission groove in a position opening into said valve reservoir such that water flowing through said drip emission groove said first direction is required to undergo directional flow change to flow through said outlet opening in a second direction generally opposite said first direction.

45. The continuous tube emitter of claim 44 wherein each of said flaps is defined between a pair of longitudinally spaced holes formed in said web generally adjacent one side margin of said web, one of said holes partially overlying and partially exposing said drip emission groove to the interior of said tube, said pair of holes being separated from said one side margin by at least one bridge strip remaining in said web for retaining said flap in relatively close overlying relation with the associated valve member.

* * * * *